United States Patent
Hedtke et al.

(10) Patent No.: US 8,578,783 B2
(45) Date of Patent: Nov. 12, 2013

(54) PROCESS FLUID PRESSURE TRANSMITTER WITH SEPARATED SENSOR AND SENSOR ELECTRONICS

(75) Inventors: Robert C. Hedtke, Young America, MN (US); John Schulte, Eden Prairie, MN (US); David A. Broden, Andover, MN (US)

(73) Assignee: Rosemount Inc., Eden Prairie, MN (US)

( * ) Notice: Subject to any disclaimer, the term of this patent is extended or adjusted under 35 U.S.C. 154(b) by 225 days.

(21) Appl. No.: 13/245,306

(22) Filed: Sep. 26, 2011

(65) Prior Publication Data

US 2013/0074604 A1 Mar. 28, 2013

(51) Int. Cl.
*G01L 9/00* (2006.01)
*G01L 19/00* (2006.01)

(52) U.S. Cl.
CPC ......... *G01L 19/0061* (2013.01); *G01L 19/0084* (2013.01)
USPC .......................................................... 73/753

(58) Field of Classification Search
USPC .................................................. 73/700–756
See application file for complete search history.

(56) References Cited

U.S. PATENT DOCUMENTS

| | | | |
|---|---|---|---|
| 4,250,490 A | 2/1981 | Dahlke | 340/870.37 |
| 4,265,124 A * | 5/1981 | Lim et al. | 73/703 |
| 4,532,510 A | 7/1985 | Bertrand et al. | 340/870.39 |
| 5,287,746 A | 2/1994 | Broden | 73/706 |
| 5,870,695 A * | 2/1999 | Brown et al. | 702/138 |
| 6,643,610 B1 | 11/2003 | Kleven et al. | 702/183 |
| 6,901,803 B2 | 6/2005 | Fandrey | 73/706 |
| 7,036,381 B2 | 5/2006 | Broden et al. | 73/708 |
| 7,258,021 B2 | 8/2007 | Broden | 73/756 |
| 7,373,831 B2 | 5/2008 | Broden | 73/715 |
| 7,698,951 B2 | 4/2010 | Brown et al. | 73/714 |
| 2002/0189362 A1 * | 12/2002 | Havlena | 73/702 |
| 2005/0284227 A1 | 12/2005 | Broden et al. | 73/708 |
| 2006/0162459 A1 | 7/2006 | Broden | 73/715 |
| 2007/0220985 A1 | 9/2007 | Hedtke | 73/715 |
| 2010/0083731 A1 * | 4/2010 | Hedtke | 73/1.57 |
| 2010/0083768 A1 * | 4/2010 | Hedtke et al. | 73/724 |
| 2012/0006119 A1 * | 1/2012 | Broden et al. | 73/716 |
| 2012/0006120 A1 * | 1/2012 | Hedtke | 73/717 |
| 2012/0079884 A1 * | 4/2012 | Broden et al. | 73/717 |

FOREIGN PATENT DOCUMENTS

RU 47964 U1 9/2005
WO WO 9627124 A1 * 9/1996

OTHER PUBLICATIONS

International Search Report and the Written Opinion for the corresponding International patent application No. PCT/US2012/042388 dated Nov. 1, 2012.

* cited by examiner

*Primary Examiner* — Andre Allen
(74) *Attorney, Agent, or Firm* — Westman, Champlin & Koehler, P.A.

(57) ABSTRACT

A process fluid pressure transmitter has a remote pressure sensor. The transmitter includes an electronics housing and a loop communicator disposed in the electronics housing and being configured to communicate in accordance with a process communication protocol. A controller is disposed within the electronics housing and is coupled to the loop communicator. Sensor measurement circuitry is disposed within the electronics housing and is coupled to the controller. A remote pressure sensor housing is configured to couple directly to a process and is spaced from the electronics housing. A pressure sensor is disposed within the remote pressure sensor housing. The pressure sensor forms at least one electrical component having an electrical characteristic that varies with process fluid pressure. Portions of the electrical component are coupled directly to a multiconductor cable that operably connects the pressure sensor to the sensor measurement circuitry.

22 Claims, 5 Drawing Sheets

PROCESS FLUID PRESSURE TRANSMITTER WITH SEPARATED SENSOR AND SENSOR ELECTRONICS

BACKGROUND

Process monitoring and control systems are used to monitor and control operation of industrial processes. Industrial processes are used in manufacturing to produce various products such as refined oil, pharmaceuticals, paper, foods, et cetera. In large scale implementations, these processes must be monitored and controlled in order to operate within the desired parameters.

"Transmitter" has become a term which is used to describe the devices which couple to the process equipment and are used to sense a process variable. Example process variables include pressure, temperature, flow, and others. Frequently, a transmitter is located at remote location (i.e. in the "field"), and transmits the sensed process variable back to a centrally located control room. Various techniques are used for transmitting the process variable including both wired and wireless communications. One common wired communication technique uses what is known as a two wire process control loop in which a single pair of wires is used to both carry information as well as provide power to the transmitter. One well established technique for transmitting information is by controlling the current level through the process control loop between 4 mA and 20 mA. The value of the current within the 4-20 mA range can be mapped to corresponding values of the process variable. Other communication protocols include the HART® communication protocol in which a digital signal is modulated on top of a 4-20 mA communication current analog signal, a FOUNDATION™ Fieldbus protocol in which all communication is carried out digitally, wireless protocols such as WirelessHART (IEC 62591), et cetera.

One type of transmitter is a pressure transmitter. In general, a pressure transmitter is any type of transmitter which measures a pressure of a fluid of the process. (The term fluid includes both gas and liquids and their combination.) A pressure transmitter can be used to measure pressures directly including differential, absolute or gage pressures. Further, using known techniques, pressure transmitters can be used to measure flows of the process fluid based upon a pressure differential in the process fluid between two locations.

Typically, a pressure transmitter includes a pressure sensor which couples to the pressure of the process fluid through an isolation system. The isolation system can comprise, for example, an isolation diaphragm which is in physical contact with the process fluid and an isolation fill fluid which extends between the isolation diaphragm and the pressure sensor. The fill fluid generally comprises a substantially incompressible fluid such as oil. As the process fluid exerts a pressure on the isolation diaphragm, changes in the applied pressure are conveyed across the diaphragm, through the isolation fluid and to the pressure sensor. Such isolation systems prevent the delicate components of the pressure sensor from being directly exposed to the process fluid.

A number of commercially-available process fluid pressure transmitters can be used effectively to measure process fluid pressure. These devices generally bring the pressure to the transmitter by virtue of an isolation system or length of pipe filled with process fluid. Examples of such architectures are shown in FIGS. 1A-1D.

FIG. 1A shows a typical steam flow installation. The process fluid pressure transmitter 10 is mounted away from the process 12 due to high temperatures. A pair of pressure impulse lines 14, 16 is used with multiple connections and vents to bring the process pressure to transmitter 10.

FIG. 1B illustrates a high temperature pressure transmitter. Pressure transmitter 20 is mounted away from the process due to high temperatures by using a secondary oil filled system for transporting pressure.

FIG. 1C is a typical remote seal system 30. In this case, the pressure is transported back to transmitter 32 through an oil filled secondary system 34.

FIG. 1D is a diagrammatic view of a flowmeter 40 where a primary element 42 creates a differential pressure. The differential pressure is transported by two impulse lines inside tube 44 up to the coplanar transmitter interface 46.

The architectures illustrated with respect to FIGS. 1A-1D have been successful and offer a number of advantages. The modular transmitter design has enabled high volume production and a highly controlled process to enhance performance. The standard coplanar interface permits distribution efficiencies and a separation point for calibration and replacement. However, these architectures do have some limitations. For example, bringing the pressure to the transmitter is costly as it requires considerable metal and secondary pressurized systems. The architecture may be subject to potential leak points, plugged lines and other impulse line issues. Moreover, these architectures may also be susceptible to mechanical vibration.

It would advance the art of process fluid pressure measurement and control to provide an architecture that can measure the pressure at its source without the need to transport this pressure outside of the normal process pressure boundaries.

SUMMARY

A process fluid pressure transmitter has a remote pressure sensor. The transmitter includes an electronics housing and a loop communicator disposed in the electronics housing and being configured to communicate in accordance with a process communication protocol. A controller is disposed within the electronics housing and is coupled to the loop communicator. Sensor measurement circuitry is disposed within the electronics housing and is coupled to the controller. A remote pressure sensor housing is configured to couple directly to a process and is spaced from the electronics housing. A pressure sensor is disposed within the remote pressure sensor housing. The pressure sensor forms at least one electrical component having an electrical characteristic that varies with process fluid pressure. Portions of the electrical component are coupled directly to a multiconductor cable that operably connects the pressure sensor to the sensor measurement circuitry.

DETAILED DESCRIPTION OF ILLUSTRATIVE EMBODIMENTS

Embodiments of the present invention generally stem from the physical separation of the pressure sensor itself from the sensor electronics. Accordingly, the only electrical component proximate the process is the pressure sensor. While attempts have been made in the past to separate a pressure sensor from sensing electronics, those attempts generally require at least some electrical circuitry, such as diodes, to be coupled to and mounted proximate the pressure sensor. Accordingly, in applications where the process fluid temperature is extremely high, such techniques would be limited to the operating temperature range of the electronic components. See for example, U.S. Pat. No. 4,250,490 to Dahlke. In accordance with various embodiments of the present invention, the only electrical component proximate the process is the pressure sensor itself. In some embodiments, a temperature sensitive element can be provided as either part of the pressure sensor, or as a discrete sensor. Accordingly, the only thermal limitations on embodiments of the present invention are those caused by the construction of the pressure sensor and/or the optional temperature sensor.

Separating the pressure sensor from the sensor electronics is counterintuitive in a high performance system. Generally, sensors are relatively high impedance, low signal devices. Separation increases opportunities to add error to the signal. In order to accommodate such physical separation, embodiments of the present invention generally include sensor electronics that help mitigate errors while enabling the benefits of a remote sensor system.

Figure 1A:
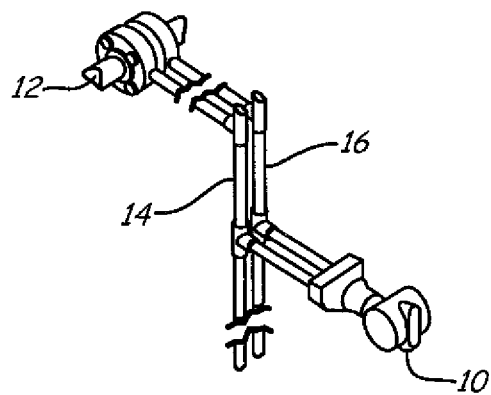
FIGS. 1A-1D illustrate exemplary architectures in which embodiments of the present invention are particularly useful.
Figure 1B:
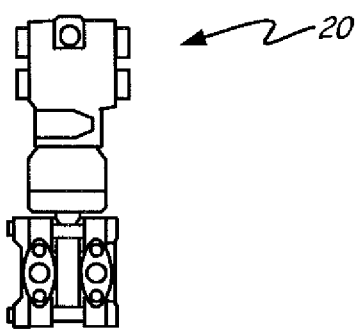
Figure 1C:
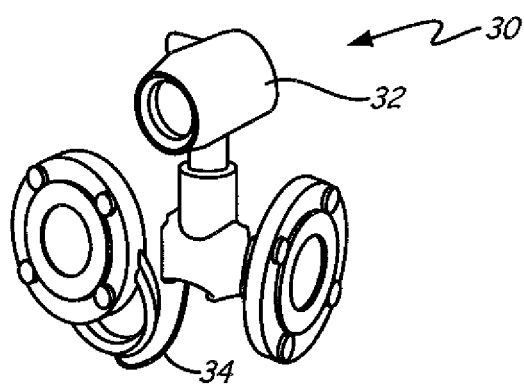
Figure 1D:
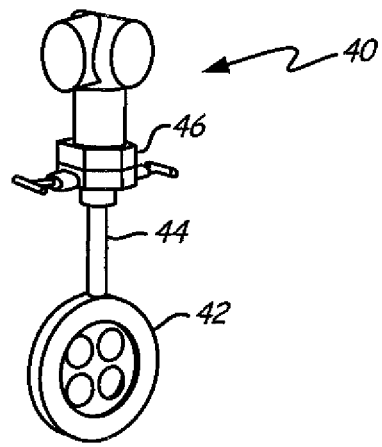
Figure 2:
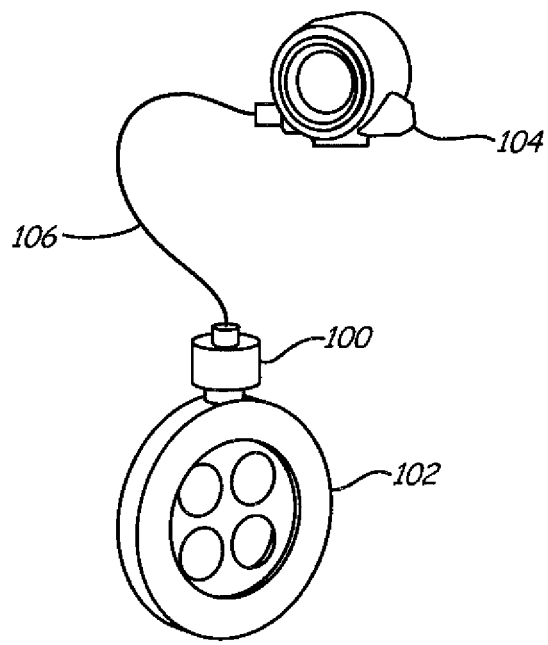
FIGS. 2 and 3 are diagrammatic views of a remote mounted pressure sensor system in accordance with embodiments of the present invention.
Figure 3:
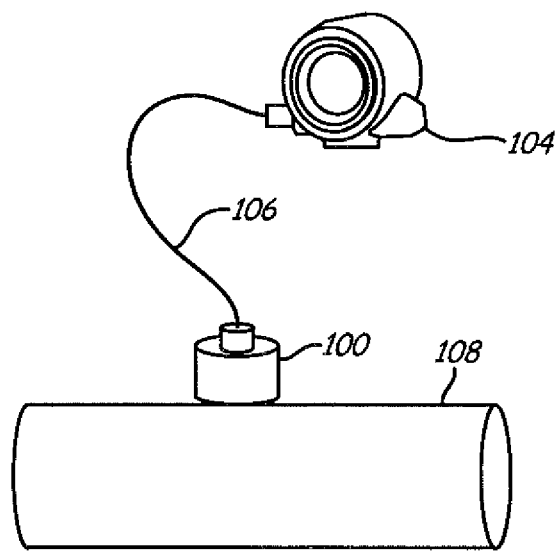

FIGS. 2 and 3 are diagrammatic views of a remote mounted pressure sensor system. FIG. 2 illustrates remote housing 100 attached to primary element 102. Remote housing 100 includes both a differential pressure sensor 204 (shown in FIG. 6) and a temperature sensor (not shown) for compensation. Each pressure related element of sensor 204, such as each capacitive plate, is coupled directly to a respective individual conductor within multi-conductor cable 106. Unlike attempts in the prior art, no electrical components (such as diodes) are interposed between the capacitive plates and each conductor of cable 106 within housing 100. Cable 106 connects electronics housing 104 to remote sensor 100 preferably using a shielded cable. Contrasting FIG. 2 with FIG. 1D, advantages are apparent which include, cost savings, and less potential leak paths. Preferably, remote housing 100 is fully integrated with primary element 102. In another embodiment, a modular design can be employed that would have remote housing 100 bolted to primary element 102. Other options can be employed as well including vent/drain valves and the utilization of manifolds. Moreover, the architecture can also accommodate multivariable applications. In one embodiment, remote housing 102 is attached to electronics housing 104 through a rigid mount that helps protect the electrical interconnection therein.

FIG. 3 is a diagrammatic view of remote sensor 100 coupled to process fluid conduit 108. By virtue of its direct coupling, the pressure sensor within housing 100 directly measures the process fluid pressure flowing or otherwise present within conduit 108 and provides an electrical characteristic, such as voltage, resistance, capacitance, inductance, et cetera that is related to the process fluid pressure. Sensor circuitry within housing 104 measures the electrical characteristic and provides a digital indication of the characteristic to processor circuitry within housing 104.

Embodiments of the present invention have been found to provide satisfactory remote performance with the physical separation between the pressure sensor and the sensor electronics on the order of two meters using capacitance-based pressure sensors. Accordingly, cable 106 can be at least two meters long and still provide satisfactory performance. Signal errors and issues of concern with respect to the physical separation include the degradation of resolution, temperature effects, stability, installation effects, noise immunity, and electronic interchangeability. While adding minimal electronics near the sensor, such as a diode bridge, could significantly increase the separation distance, such components would limit the maximum operating temperature to the operating range of such electrical components. If a temperature sensitive element is included in the remote sensor, it must be able to withstand extremely high temperature for such applications. In a preferred embodiment, the pressure sensor itself provides for a measurement of sensor temperature such that a separate temperature sensor, able to withstand high temperatures, is not needed.

Performance optimization is accomplished using shielded sensor wire and harmonizing circuit specifics within the sensor circuitry to match the new circuit dynamics. For example, adding a longer sensor cable to a capacitive sensor will increase the capacitance. Existing electronics may perform poorly due to insufficient bias currents and settling times. Optimizing, or at least adjusting, bias currents and settling time are believed to resolve such a performance issues.

Figure 4:
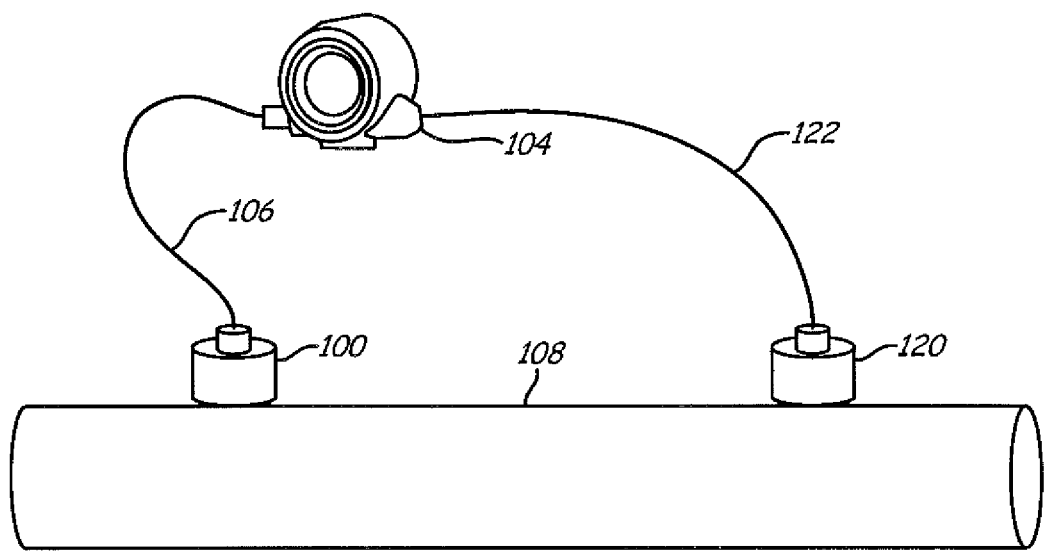
FIG. 4 is a diagrammatic view of a plurality of remote pressure sensors coupled to a single electronics housing in accordance with an embodiment of the present invention.

In accordance with various embodiments of the present invention, multiple remote sensors can be connected to a single set of remote electronics, such as a remote process seal application. FIG. 4 is a diagrammatic view of a plurality of remote pressure sensors 100, 120 coupled to a single electronics housing 104 via multi-conductors cables 106, 122, respectively. This arrangement could offer unique advantages in minimizing latency effects in a multiple sensor system. An additional option is to provide multiple measurement circuits within a single housing 104.

Embodiments of the present invention may create some unique safety approval issues. One solution to such issues would be to mount remote sensor 100 in an explosion-proof housing and control the cable connection between the housing of remote sensor 100 and electronics 104. While this approach could achieve prerequisite safety approvals, it would add costs and reduce installation flexibility. Instead, it is preferred that an intrinsic safety barrier be added to electronics 104 similar to that currently done with commercially available vortex meters. Remote sensor 100 now becomes an intrinsically safe system which allows significant flexibility in the selection and design of cable 106. Additionally, remote sensor 100 does not need to be packaged in an explosion proof housing which will reduce housing cost and complexity including the need to use electrical discharge machine (EDM) holes.

Figure 5:
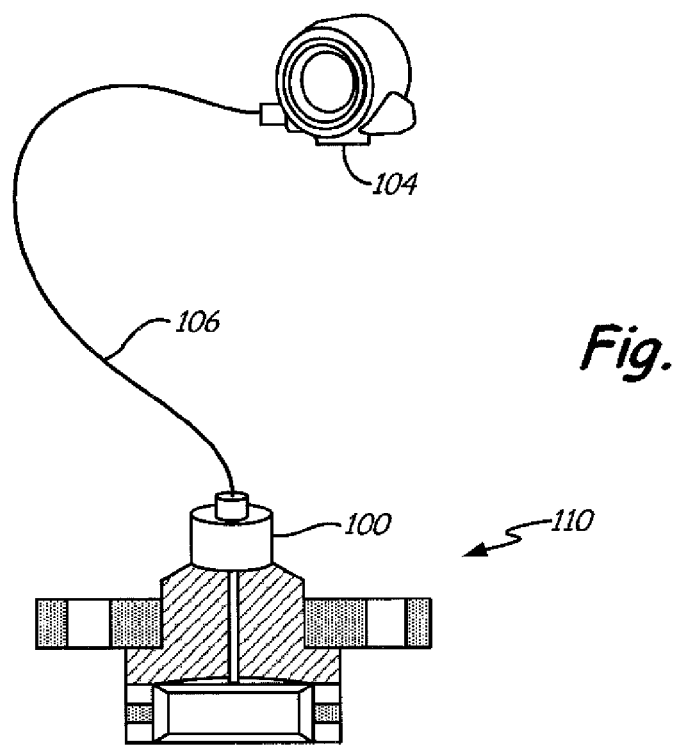
FIG. 5 is a diagrammatic view of a remote sensor coupled to or embodied within a remote seal in accordance with an embodiment of the present invention.

FIG. 5 is a diagrammatic view of remote sensor 100 coupled to or embodied within a remote seal 110. As with previous embodiments, sensor 100 is coupled to electronics housing 104 via multi-connector shielded cable 106. Accordingly, unlike the device illustrated with respect to FIG. 1C with an extended length of capillary tubing 34, remote seal 110 is coupled to its electronics housing 104 by virtue of electronic cable 106.

Embodiments of the present invention generally reduce the number of fluidic connections need to effectively measure process fluid pressure. Moreover, fluid-filled conduits, such impulse lines and capillaries are essentially obviated with embodiments of the present invention. A further advantage of embodiments of the present invention is that the use or need of heat tracing can be reduced. For applications such as those depicted in FIG. 1A, the impulse piping is filled with a gas or fluid that can freeze, or otherwise produce solid phase material that can clog the tube and impair measurement of the process pressure. End users typically install heat tracing around the impulse tube to prevent this from happening. Thus, embodiments of the present invention may eliminate the impulse tube altogether, and thus the need for heat tracing is eliminated as well.

While embodiments of the present invention are generally described with respect to a differential pressure sensor, embodiments can be practiced with respect to any type of pressure sensor including absolute and gage pressure sensors. Further, while embodiments of the present invention are generally described with respect to a capacitive-type flexible-diaphragm pressure sensor, embodiments of the present invention can be practiced with any structure that reacts to pressure by varying an electrical characteristic. Thus, embodiments of the present invention include resistive strain-gauge type sensors, piezoelectric pressure sensors, piezoresistive pressure sensors, electromagnetic pressure sensors, resonant sensors, et cetera.

Embodiments shown in FIGS. 2-6 use a flexible cable between the sensor and electronics. An optional embodiment would use a hard mount connection. For example, the sensor and electronics could be physically connected by a pipe or bracket. This would make installation easier and protect the cable from electrical noise and physical damage.

Figure 6:
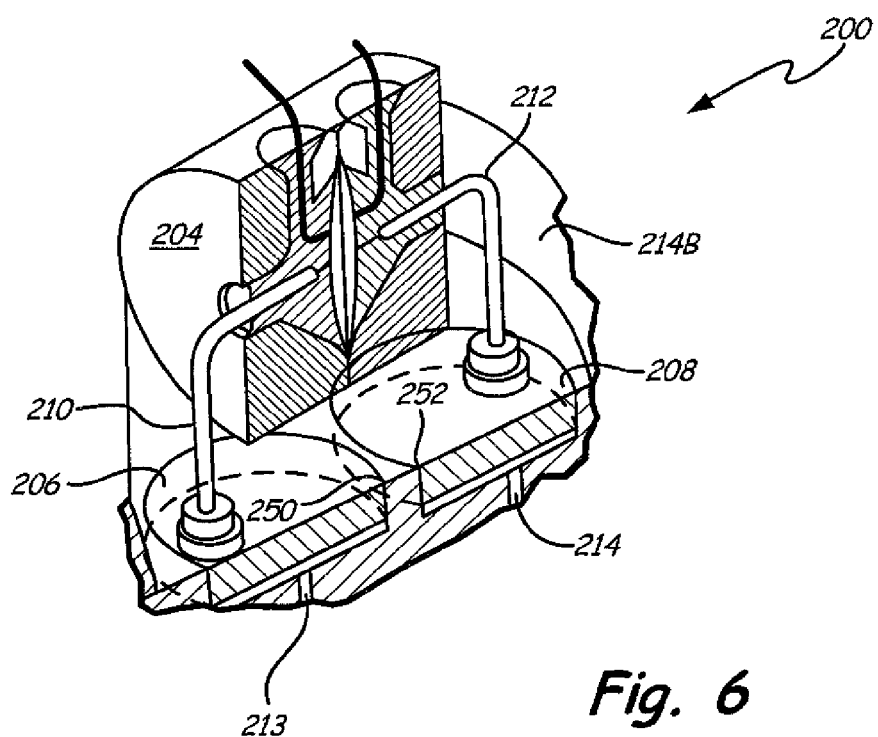
FIG. 6 is a cross-sectional diagrammatic view of a flexible-diaphragm, capacitance-based differential pressure sensor useful with embodiments of the present invention.

FIG. 6 is a cross-sectional diagrammatic view of a flexible-diaphragm, capacitance-based differential pressure sensor 204 that is useful with embodiments of the present invention. While the actual construction of pressure sensor 204 can take any suitable form, one specific embodiment of the present invention uses a fill fluid such as that illustrated in FIG. 6. Further details with respect to differential pressure sensor 204 can be found in U.S. Pat. No. 6,901,803, assigned to the assignee of the present invention. Pressure sensor module 200 includes pressure sensor 204 and fluid isolator members 206, 208 and tubes 210, 212 extending from pressure sensor 204 to a fluid isolator member 206, 208. Process fluid enters one or both of tubes 213, 214 and bears upon isolator members 206, 208 respectively. Each of isolator members 206, 208 includes an isolator diaphragm that physically separates the process fluid from fill fluid within tubes 210, 212. Accordingly while the process fluid is physically prevented from contacting pressure sensor 204, the pressure of process fluid is conveyed from tubes 213, 214 through tubes 210, 212, respectively to sensor 204. In one embodiment, each of tubes 213, 214 is directly coupled to the respective high and low pressure sides of a primary element, such as that illustrated in FIG. 2.

For typical applications, the remote pressure sensor enables a number of advantages including cost savings, installation savings, improved safety and reliability. For these applications, the sensor can leverage existing design concepts. In one embodiment, sensor 204 is preferably oil-filled with standard silicone oil and isolated in the housing using a suitable potting material. If the remote sensor were modular, the coplanar interface could use standard polytetrafluoroethylene o-rings, or suitable metal O-rings.

Figure 7:
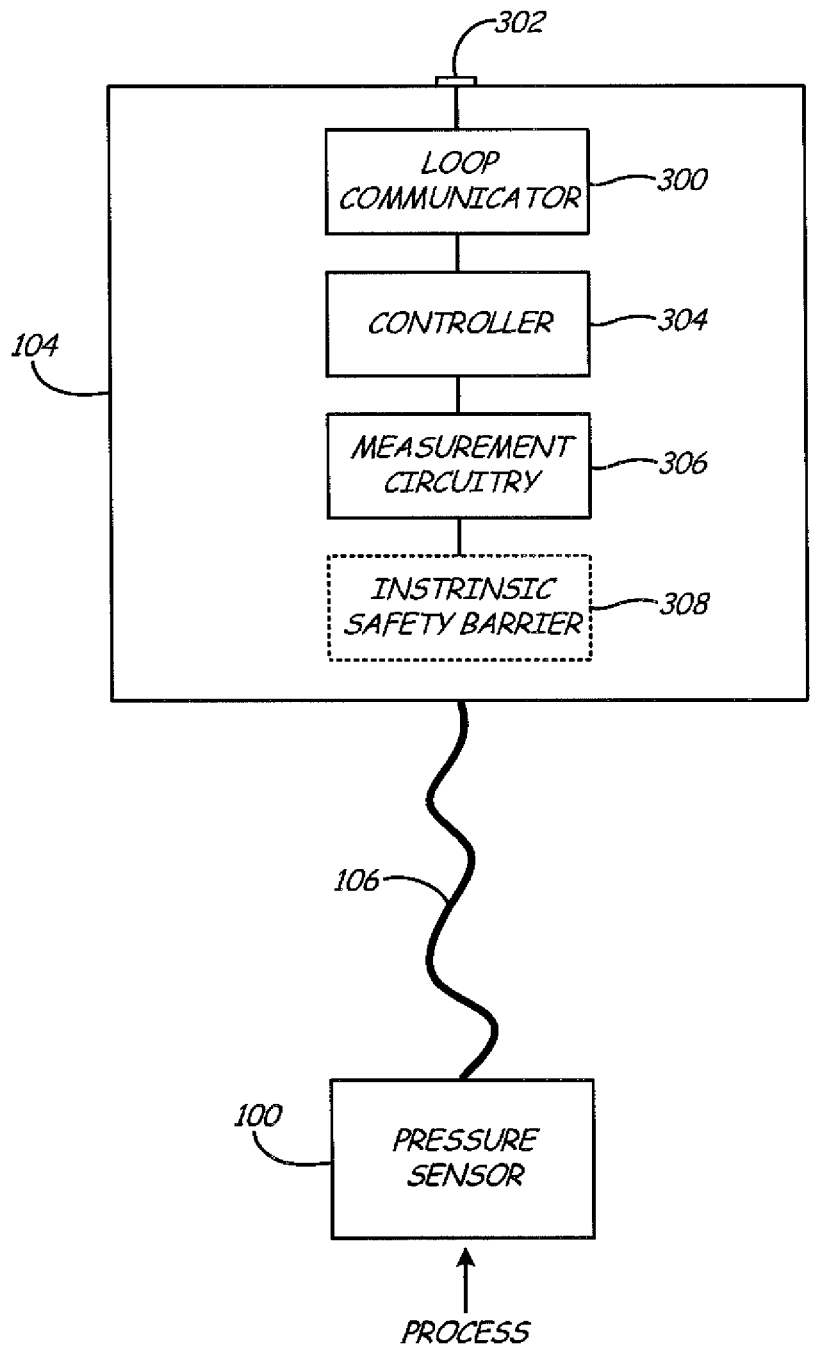
FIG. 7 is a system block diagram of a remote pressure measurement system in accordance with embodiment of the present invention.

FIG. 7 is a system block diagram of remote pressure measurement system in accordance with embodiment of the present invention. Remote electronics module 104 is operably coupled to remote pressure sensor 100 via cable 106. Remote pressure sensor 100 can include any suitable pressure sensor and is operably coupled to a source of process fluid pressure. Sensor electronics 104 includes a loop communicator module 300 operably coupled to a plurality of terminals 302 for coupling electronics 104 to a suitable process communication loop. Examples of process communication loops include the known 4-20 mA analog signaling loop, HART® signaling, FOUNDATION™ Fieldbus techniques, as well as other suitable process communication loops or segments. Loop communicator 300 is operably coupled to controller 304 which, in one embodiment, is preferably a microprocessor. Controller 304 is, in turn, coupled to measurement circuitry 306 which is operably coupled to pressure sensor 100 via cable 106. In some embodiments, an intrinsic safety barrier 308 is electrically interposed between measurement circuitry 306 and pressure sensor 100. While FIG. 7 illustrates measurements circuitry 306 existing as a single block, it may, in fact, include a plurality of such modules in order to couple to a plurality of remote pressure sensors. Moreover, in some embodiments, a switch or suitable multiplexer can be used to essentially sequentially or selectively couple a number of pressure sensors to a single measurement circuitry module 306.

Embodiments of the present invention provide a number of advantages over existing techniques for measuring process fluid pressure. The remote sensor provides the capability to be used in severe applications such as high temperatures. As process temperatures increase, the limitations of non-metallic materials must be considered. Requirements vary as temperature and pressures of the process rise. The following are examples of an illustrative steam application for which embodiments of the present invention are particularly useful. High temperature pressure sensors are not limited to steam applications, but other applications would be unlikely to exceed 400° F.

Current commercially-available process fluid pressure measurement systems using coplanar pressure measurement are typically limited to a temperature of 250° F. Embodiments of the present invention are believed to be useful for high pressure, high temperatures, and are believed to operate up to 400° F. including for some subsea applications. In one embodiment, the pressure sensor may be a capacitance-based pressure sensor such as that illustrated with respect to FIG. 6, where the fill oil is a single component silicone diffusion pump fluid such as Xiameter brand silicone fluid available from Dow Corning Corporation of Midland Mich. Moreover, it is preferred that sensor 204 be mounted in a potting material, and that no o-rings be used due to high pressures. A 400° F. limit would also provide a number of advantages for differential pressure flow applications. Lower pressures applications could utilize a modular construction wherein the remote pressure sensor could be bolted to a primary element. In such lower pressure applications, the O-rings could be metallic or polytetrafluoroethylene which is listed as having an operating temperature up to 400° F. Many of the process valves and seal designs use polytetrafluoroethylene so the sensor would now be capable of operating at the same temperature that the polytetrafluoroethylene operates.

Most of the steam applications currently measured are at or below 900# ANSI pressure rating. The maximum pressure for that rating changes with temperature. The maximum pressure for 100° F. is 3,350 PSI, for 400° F. the maximum pressure is 1,900 PSI, for 750° F., the maximum pressure is 1,510 PSI.

Process seal design variations include using both standard polytetrafluoroethylene O-rings for lower temperatures (less than 400° F.) and pressures less than approximately 6,000 PSI. For more demanding applications, metallic O-rings can be used allowing operation at higher temperatures and pressures. Eliminating process seals altogether with an all-welded system can also be provided. Oil fill design variations include replacing silicone oil with an oil that can withstand higher temperatures. It may be possible to raise the limit to 500° F. or 600° F. by using a suitable oil.

One preferred embodiment for very high temperatures and for compact designs is to use oil-less sensors without isolation diaphragms. In such a system, the process fluid or media is brought directly in contact with the deflectable diaphragm. These applications require the process fluid to be compatible with the sensor material. In these applications, other types of pressure sensors may be more useful. One exemplary pressure sensor for such applications is set forth in U.S. Pat. No. 6,508,129 assigned to the assignee of the present invention.

Integrating a differential pressure sensor into a remote seal diaphragm results in similar benefits. The oil-filled capillary system is obviated, which reduces the number of fluidic connections, the potential for fill fluid to leak, and also helps reduce or eliminate any thermal effects provided by the fill fluid within the capillary of the remote seal.

While the foregoing has been a description listing of a number of advantages with respect to embodiments of the present invention. Those skilled in the art will recognize that a number of additional advantages are provided as well.

Although the present invention has been described with reference to preferred embodiments, workers skilled in the art will recognize that changes may be made in form and detail without departing from the spirit and scope of the invention.

What is claimed is:

1. A process fluid pressure transmitter having a remote pressure sensor, the transmitter comprising:
    an electronics housing;
    a loop communicator disposed in the electronics housing and being configured to communicate in accordance with a process communication protocol;
    a controller disposed within the electronics housing and coupled to the loop communicator;
    sensor measurement circuitry disposed within the electronics housing and coupled to the controller;
    a remote pressure sensor housing configured to couple adjacent to a process and being spaced from the electronics housing;
    a pressure sensor disposed within the remote pressure sensor housing, the pressure sensor forming at least one electrical component having an electrical characteristic that varies with process fluid pressure; and
    wherein portions of the electrical component are coupled directly to a multiconductor cable that operably connects the pressure sensor to the sensor measurement circuitry.

2. The process fluid pressure transmitter of claim 1, wherein the electrical component comprises at least one capacitor, and wherein each portion of the electrical component is a capacitive plate.

3. The process fluid pressure transmitter of claim 1, wherein the remote pressure sensor housing includes at least one isolation diaphragm isolating process fluid from the pressure sensor, but conveying process fluid pressure to the pressure sensor.

4. The process fluid pressure transmitter of claim 3, wherein the process fluid pressure is conveyed through a substantially incompressible fill fluid.

5. The process fluid pressure transmitter of claim 4, wherein the fill fluid is a single component silicone diffusion pump fluid.

6. The process fluid pressure transmitter of claim 1, wherein the pressure sensor is disposed to directly contact process fluid.

7. The process fluid pressure transmitter of claim 1, wherein the pressure sensor housing and electronics housing are coupled together with a rigid mount.

8. The process fluid pressure transmitter of claim 1, wherein the multiconductor cable is a shielded multiconductor cable.

9. The process fluid pressure transmitter of claim 1, and further comprising a temperature sensor disposed in the remote pressure sensor housing and being configured to measure process fluid temperature and provide an indication thereof to the sensor circuitry through the multiconductor cable.

10. The process fluid pressure transmitter of claim 9, wherein the controller is configured to compensate for thermal effects.

11. The process fluid pressure transmitter of claim 9, wherein the pressure sensor and the temperature sensor comprise the only electrical components within the pressure sensor housing.

12. The process fluid pressure transmitter of claim 1, wherein the remote pressure sensor housing is filled with a potting compound.

13. The process fluid pressure transmitter of claim 1, and further comprising:
    a second remote pressure sensor housing configured to couple directly to a process;
    a second pressure sensor disposed within the second remote pressure sensor housing, the second pressure sensor forming at least one electrical component having an electrical characteristic that varies with process fluid pressure; and
    wherein portions of the electrical component are coupled directly to a multiconductor cable that operably connects the second pressure sensor to the sensor measurement circuitry.

14. The process fluid pressure transmitter of claim 1, wherein the pressure sensor comprises the only electrical component within the pressure sensor housing.

15. The process fluid pressure transmitter of claim 1, wherein the transmitter is configured to measure one of differential, gage, and absolute process fluid pressures.

16. The process fluid pressure transmitter of claim 1, wherein the remote pressure sensor housing is integrated into a process flow primary element.

17. The process fluid pressure transmitter of claim 1, wherein the remote pressure sensor housing is integrated into a remote process seal.

18. The process fluid pressure transmitter of claim 1, wherein the remote pressure sensor housing is integrated into a process vessel.

19. The process fluid pressure transmitter of claim 1, wherein the remote pressure sensor housing is integrated into a flow measurement device.

20. The process fluid pressure transmitter of claim 1, wherein the remote pressure sensor housing is coupled to the process in a coplanar pattern.

21. The process fluid pressure transmitter of claim 1, wherein the remote pressure sensor housing is modular.

22. The process fluid pressure transmitter of claim 1, and further comprising an intrinsic safety barrier disposed within the electronics housing and electrically interposed between the sensor electronics circuitry and the multiconductor cable.

* * * * *